United States Patent [19]

Naito

[11] Patent Number: 4,550,341
[45] Date of Patent: Oct. 29, 1985

[54] UNAUTHORIZED OBSERVATION PREVENTING DEVICE FOR CATV SYSTEM

[75] Inventor: Akihiko Naito, Tokyo, Japan

[73] Assignee: Pioneer Electronic Corporation, Tokyo, Japan

[21] Appl. No.: 404,736

[22] Filed: Aug. 3, 1982

[51] Int. Cl.[4] .......................... H04N 7/16; H04K 1/00
[52] U.S. Cl. ....................................... 358/114; 358/86; 358/122
[58] Field of Search ................... 358/84, 86, 114, 117, 358/122

[56] References Cited

U.S. PATENT DOCUMENTS

| 3,886,302 | 5/1975 | Kosco | 358/122 |
| 3,899,633 | 8/1975 | Sorenson et al. | 358/118 |
| 4,081,831 | 3/1978 | Tang et al. | 358/114 |
| 4,215,366 | 7/1980 | Davidson | 358/124 |
| 4,313,132 | 1/1982 | Doles et al. | 358/114 |
| 4,317,215 | 2/1982 | Tabata et al. | 358/86 |
| 4,347,604 | 8/1982 | Saito et al. | 370/85 |
| 4,430,669 | 2/1984 | Cheung | 358/122 |
| 4,454,538 | 6/1984 | Toriumi | 358/86 |
| 4,455,570 | 6/1984 | Saeki et al. | 358/86 |

Primary Examiner—S. C. Buczinski
Attorney, Agent, or Firm—Sughrue, Mion, Zinn Macpeak & Seas

[57] ABSTRACT

In a cable television system of the type wherein a cable television signal including free and restricted television channels is subjected to selective frequency conversion at individual terminal units to obtain a desired one of the channels for observation, a signal detector is provided for detecting the presence or absence of a polling signal from the central facility and the frequency converter is either disabled or adjusted for reception of a free channel if no polling signal is received.

6 Claims, 2 Drawing Figures

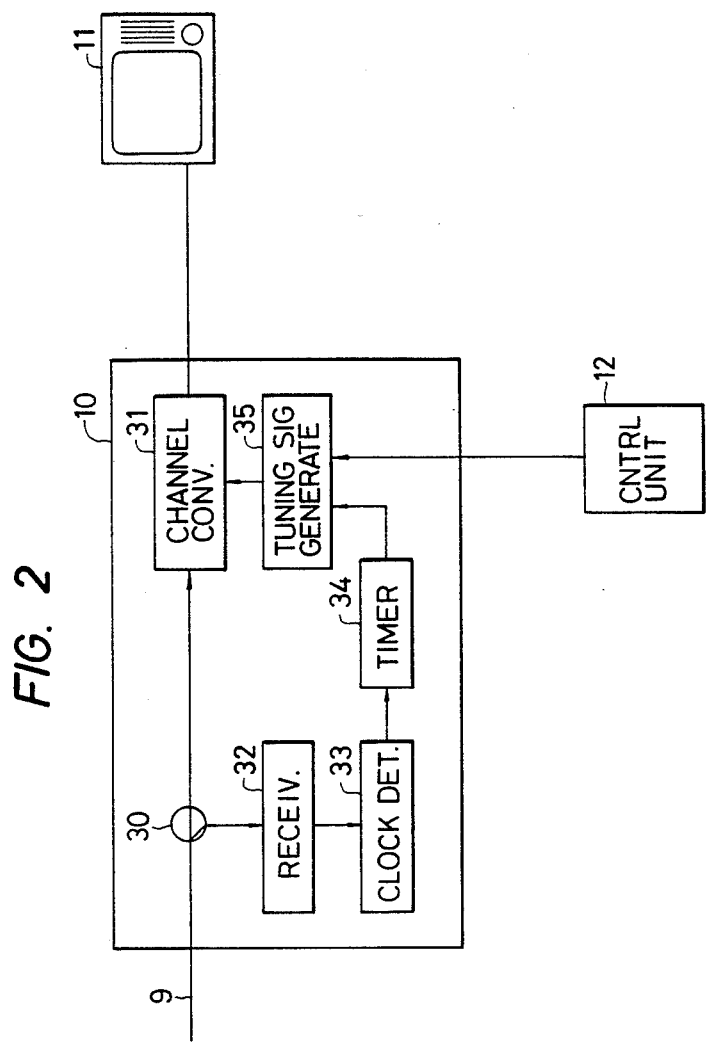

UNAUTHORIZED OBSERVATION PREVENTING DEVICE FOR CATV SYSTEM

BACKGROUND OF THE INVENTION

This invention relates to a CATV system in which the central facility (hereinafter referred to as "a center", when applicable) is connected through cables to a number of terminal units so that communication is effected between the center and the terminal units, and more particularly to an unjust, or unauthorized, observation preventing device for a CATV system which can prevent programs from being unjustly watched at the terminal unit.

A CATV system in which the invention may be employed will be described with reference to FIG. 1. The CATV system includes a single base or center 1 and terminal units 28 which are provided, for example, in several tens of thousands of subscriber's homes. The center 1 is connected through coaxial cables to the terminal units 28. A main cable 3 extends from the center 1 and main cable amplifier 4 and branching units 5 are provided at predetermined positions on the main cable 3. A plurality of branch cables 6 extend from each branching unit 5. Extension amplifiers 7 and tap-off units 8 are provided at predetermined points on the branch cables 6. Each tap-off unit 8 is connected to branch lines 9 which extend to the terminal units 28 in individual homes 2. Each terminal unit 28 includes a main unit 10, a television set 11 and a control unit 12. The branch line 9 is connected to the main unit 10 which is in turn connected to the television set 11 and to the control unit 12. As is apparent from the above description, the main cable extending from the center is branched into a first plurality of branch cables which are further branched into a second plurality of branch lines which are finally connected to the terminal units 28.

A signal receiving antenna 13 is installed outside the center 1. The antenna 13 is connected to a demodulator 15 in a source group 14 of the center 1. The source group 14 further includes a video disc player 16, a video tape recorder 17 and a studio 18. The output signals of the source group 14 are applied to a modulation output section 19 composed of two systems. One of the two systems includes an IF modulator circuit 20, a scramble circuit 21, and an up-converter circuit 22, while the other system includes an IF modulator circuit 23 and an up-converter circuit 24. The outputs of the up-converters 22 and 24 are connected to the main cable 3, to which a data transceiver 25 is connected for data communication between the center 1 and each main unit 10. The data transceiver 25 is connected to a computer 26 which is connected to a peripheral unit 27 such as a printer or a display unit.

The operation of the CATV system thus constructed will now be described.

First, the power switch of the television set 11 is turned on. With the television set 11 set to a particular unused channel, the control unit 12 is operated so that the frequency of a desired channel to be received is set to that of the unused channel. The channels which can be selected by the control unit 12 as described above can be classified into three groups of channels for (A) retransmission programs in which television signals from local stations are received without modification, (B) independent programs (free of charge), and (C) chargeable (pay) programs. Each group is allocated ten channels, and therefore any of the thirty channels can be selected by operating the control unit 12.

(A) Retransmission programs

Television signals received by the antenna 13 are demodulated by the demodulator 15 and applied to the modulation output section 19. The signal thus applied is modulated by the IF modulator circuit 23. The frequency of the signal thus modulated is increased to a predetermined frequency by the up-converter circuit 23 according to a determined frequency allocation scheme. That is, it is assigned to a predetermined channel. The resultant signal is applied through the main cable 3, the branch cables 6, and the branch lines 9 to the television sets 11.

(B) Independent programs

The independent programs include locally originating programs such as weather forecast programs, news programs, and the like. In the case of programs recorded on discs of the video disc player 16 or on the video tape recorder 17 or in the case of live programs produced in the studio 18, the video signal is modulated by the IF modulator circuit 23 and the frequency of the signal thus modulated is increased to that of a predetermined channel by the up-converter circuit 24. The resultant signal is applied to the main cable 3. Reception of these programs is free of charge. That is, the "price" of these programs is included in the basic monthly charge paid by the subscriber.

(C) Chargeable programs

The chargeable programs include new movie programs, special programs, and the like. In the case of programs provided by the video disc player 16 or the video tape recorder 17 or in the case of live programs produced in the studio 18, the video signal is modulated by the IF modulator circuit and is then processed by the scrambler circuit 21 so that the signal cannot be reproduced without special signal processing. Then, the frequency of the signal is increased to that of a predetermined designated channel, and is applied to the main cable 3. In order to receive the chargeable programs, the video signal must be descrambled by the main unit 10 in the subscriber's home 2 so that a regular image appears on the television set 11. The subscriber is charged for the reception of the chargeable programs. That is, predetermined charges therefore are summed, and the user is requested to pay a special charge at a measured rate in addition to the basic monthly charge.

As described above, the center 1 is connected through coaxial cables to the terminal units in the subscribers' homes 2. However, in order to charge the subscribers for the reception of the chargeable programs, it is absolutely necessary to detect which subscribers receive which channels. That is, it is necessary to detect the channels which have been selected by the subscribers at various times. In order to meet this requirement, the data transceiver 25 outputs a retrieving signal at predetermined time intervals so that the terminal units 28 are called via their assigned address numbers. In this way, the channels received by the terminal units at the time of transmission of the retrieving signal are detected, this operation being referred to as "polling." In response to this polling, each terminal unit 28 "answers" the data transceiver 25 with data representative of the channel received by the terminal unit at the time of polling. Various reception and transmission data for the data transceiver 25 are arranged and stored by the computer 26 and are displayed or printed out by the peripheral unit 27. The polling operation is carried out at predetermined time intervals of several seconds to several tens of seconds and therefore audience ratings can be readily calculated.

Sometimes, the subscribers may participate in the production of programs. In this case, by operating the control units 12, they can answer questions proposed in a program or the like while watching the television sets 11. The answers are transmitted through the coaxial cables to the center 1.

The bi-directional data communication between the center and the terminal units 28 is as described above. In order to satisfactorily run the system, it is necessary for the center 1 to detect (or know) the operating conditions of the terminal units 28 at all times. For instance if the center cannot prevent chargeable programs from being watched unjustly, then it is impossible to correctly and fairly charge the subscribers, and finally it is difficult to smoothly run the system. Thus, it is essential for the CATV system to prevent the unauthorized observation of programs. Heretofore, for this purpose, the center 1 has transmitted the video signal and the data signal "downstream" to the terminal units 28 at all times, while the terminal units 28 send "upstream" data signals to the center 1 to indicate what channels they are using so that the center can detect the operating conditions of the terminal units 28, as described above. However, if some means is used to interrupt the reception of an operating condition retrieving signal included in the "downstream" data signal, or to obstruct the transmission of the "upstream" data signal by which the channel using conditions are informed to the center 1, then the center cannot detect the operating conditions of the terminal unit 28 any longer, and cannot prevent the unauthorized observation of programs.

SUMMARY OF THE INVENTION

In view of the foregoing, an object of this invention is to provide an unauthorized observation preventing device for a CATV system, in which means for discriminating whether or not an operating condition retrieving signal is inputted is provided in each terminal unit, so that when the particular signal is interrupted, the observation of programs at the terminal unit is stopped, whereby the unauthorized observation of programs is prevented.

In the preferred embodiment of this invention, a main box, which includes a channel converter for converting the received cable signal to a particular channel frequency in response to a tuning signal generator which is controlled by the user through a control unit, also includes a receiver for receiving a polling signal from the central facility and a clock detection unit for detecting the presence of a predetermined clock frequency within the polling signal. When the predetermined clock frequency is not detected, the tuning signal generator is disabled or is automatically switched to cause reception of one of the free channels of the cable system. A timer is preferably provided for causing the protective feature to be implemented only after the clock frequency has been absent for a predetermined period of time.

BRIEF DESCRIPTION OF THE DRAWINGS

The invention will be more clearly understood from the following description in conjunction with the accompanying drawings, in which:

FIG. 2 is a block diagram showing the arrangement of a terminal unit according to the present invention.

DETAILED DESCRIPTION OF THE INVENTION

Figure 1:
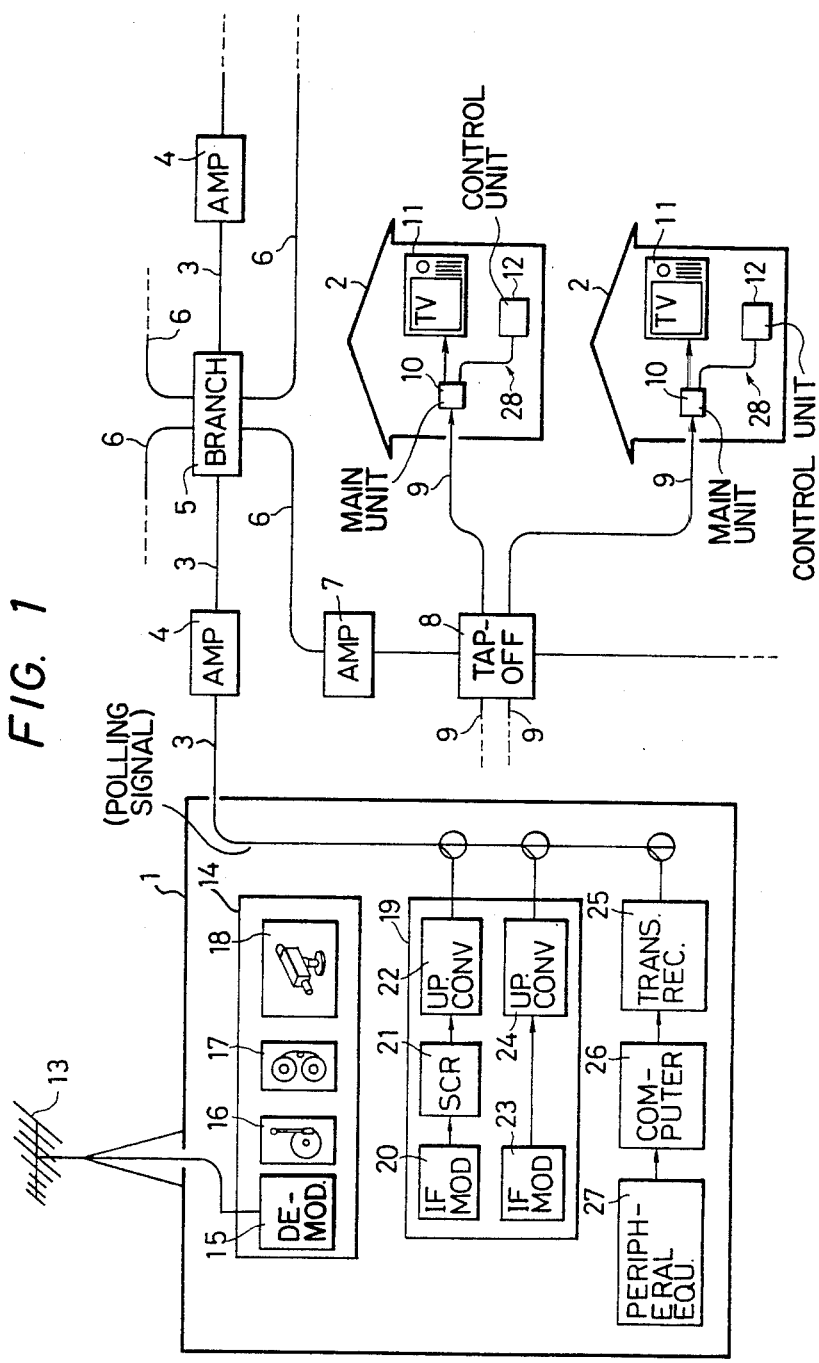
FIG. 1 is an explanatory diagram outlining a CATV system in which the invention may be employed.

One embodiment of this invention will be described with reference to FIG. 2. The branch cable 9 is connected through a branch unit 30 to a channel converter 31 in the main box 10. The output of the channel converter 31 is connected to the television set 11. The branch unit 30 is connected to a signal receiving section 32 for for receiving a "downstream" data signal. The signal receiving section 32 is connected to a clock detecting section 33, which is connected to a timer section 34. The timer section 34 is connected to a tuning signal generating section 35, to which the aforementioned control box 12 is connected. The output of the tuning signal generating section 35 is connected to the above-described channel converter.

The operation of the embodiment thus organized will now be described. The center transmits an operating condition retrieving signal of a particular frequency to the terminal units 28 at all times. The signal includes clock pulses, and when the main box 10 operates satisfactorily, the signal receiving section 32 receives the signal of the particular frequency mentioned above, while the clock detecting section 33 detects the clock pulses included in the operating condition retrieving signal. When it is determined that the particular signal is received satisfactorily, the clock detecting section 33 applies no output signal to the timer section 34. Therefore, the tuning signal generating section 35 is controlled by the control box 12. As a result, the tuning signal generating section 35 is caused to output a tuning signal corresponding to the selected channel, while the channel converter 31 operates to convert the frequency of the selected channel into that of the particular channel, so that the desired program can be watched on the television set 11.

If the subscriber employs some means for unauthorized observation of programs so that the terminal unit 28 cannot receive the "downstream" data signal, then the signal receiving section 32 cannot receive the signal of the particular frequency. Accordingly, the clock detecting section 33 detects the fact that no clock pulses are available, and applies the detection signal to the timer section 34. After receiving the detection signal from the clock detecting section 33 for several minutes, the timer 34 supplies an operation stopping signal to the tuning signal generating section 35, so that the tuning signal from the tuning signal generating section 35 is forcibly changed into that for a preset channel (which is an empty channel or a channel for free programs. Thus, the unauthorized observation can be prevented. Since the operation stopping signal from the timer section 34 takes precedence over the selection signal from the control box 12, the channel selecting operation cannot be achieved no matter how the control box 12 is operated.

The timer section 34 supplies the operation stopping signal after receiving the detection signal from the clock generating section for several minutes, as described above. This is to prevent the problem wherein the computer 26 or data transmitting and receiving unit 25 in the center becomes out of order whereby the particular frequency carrier or clock pulse cannot be transmitted, and it is immediately determined that the program is being watched unjustly. If auxiliary equipment in the center 1 is operated to transmit the particular signal within several minutes, then the program can be continuously watched at the terminal unit 28, irrespective of the failure at the center 1.

Since the unauthorized observation preventing device is designed as described above, the unjust observation of programs by the use of unauthorized means at the terminal unit can be prevented. That is, the use of the unauthorized means makes it impossible for the user to watch the program on the television set, thus serving as a warning to the dishonest user. Thus, the unjust observation preventing device will contribute to smooth operation of the CATV system.

What is claimed is:

1. In a cable television system in which a central facility is connected through cables to a number of terminal units and communication is effected between said central facility and said terminal units, an unauthorized observation-preventing device, characterized by comprising:
   detecting means at each terminal unit for detecting when a particular signal from said central facility is received satisfactorily; and
   stopping means at each terminal unit for stopping the operation of a television set when said detecting means determines that said particular signal is not received satisfactorily;
   said stopping means including a timer for providing a control signal to a tuning signal generator a predetermined period of time after the absence of said particular signal is detected whereby a tuning signal from said tuning signal generator is then automatically generated for operating a channel conversion means to enable reception of a preselected channel.

2. An unauthorized observation preventing device as claimed in claim 1, wherein said cable television system is of the type having channel conversion means for receiving from said cables a cable television signal including a plurality of channels and for converting one of said channels to a predetermined channel frequency in response to said tuning signal, and a tuning signal generator for providing said tuning signal to said channel conversion means, said stopping means disabling said tuning signal generator.

3. An unauthorized observation preventing device as claimed in claim 1, wherein said cable television system is of the type having channel conversion means for receiving from said cables a cable television signal including a plurality of channels and for converting one of said channels to a predetermined channel frequency in response to said tuning signal, and a tuning signal generator for providing said tuning signal to said channel conversion means, said stopping means comprising means for controlling the tuning signal output of said tuning signal generator to cause said channel conversion means to select a predetermined one of said plurality of cable television channels.

4. An unauthorized observation preventing device as claimed in claim 2 or 3, wherein said detecting means comprises a receiver for receiving said cable television signal and a detection circuit for detecting the presence of a particular frequency in said cable television signal.

5. An unauthorized observation preventing device as claimed in claim 1, wherein said preselected channel is an empty channel.

6. An unauthorized observation preventing device as claimed in claim 1, wherein said preselected channel is a free channel.

* * * * *